(12) United States Patent
Smith

(10) Patent No.: US 11,063,397 B2
(45) Date of Patent: *Jul. 13, 2021

(54) FLUSH RING SPACER FOR ELECTRICAL RECEPTACLES

(71) Applicant: Donald Smith, Geneva, IL (US)

(72) Inventor: Donald Smith, Geneva, IL (US)

(*) Notice: Subject to any disclaimer, the term of this patent is extended or adjusted under 35 U.S.C. 154(b) by 60 days.

This patent is subject to a terminal disclaimer.

(21) Appl. No.: 16/600,802

(22) Filed: Oct. 14, 2019

(65) Prior Publication Data

US 2020/0044399 A1 Feb. 6, 2020

Related U.S. Application Data

(63) Continuation of application No. 15/585,361, filed on May 3, 2017.

(51) Int. Cl.
| | | |
|---|---|---|
| H01R 25/00 | (2006.01) | |
| H02G 3/12 | (2006.01) | |
| H01R 43/26 | (2006.01) | |
| H02G 3/14 | (2006.01) | |
| H01R 13/74 | (2006.01) | |

(52) U.S. Cl.
CPC .......... *H01R 25/006* (2013.01); *H01R 13/74* (2013.01); *H01R 43/26* (2013.01); *H02G 3/12* (2013.01); *H02G 3/14* (2013.01); *H02G 3/123* (2013.01)

(58) Field of Classification Search
CPC .... H05K 5/0004; H05K 5/00091; H05K 5/03; H05K 5/04; H01R 25/006; H01R 43/26; H01R 13/74; H02G 3/12; H02G 3/123; H02G 3/14
See application file for complete search history.

(56) References Cited

U.S. PATENT DOCUMENTS

| | | | |
|---|---|---|---|
| 4,163,882 A | 8/1979 | Baslow | |
| 4,909,692 A | 3/1990 | Hendren | |
| 6,586,679 B2 | 7/2003 | Bashford | |
| 10,490,961 B2 * | 11/2019 | Smith | H01R 13/74 |

OTHER PUBLICATIONS https://homebuilding.thefuntimesguide.com/electrical_outlet_spacers/.
http://www.homedepot.com/p/Ideal-Spacers-25-Pack-172451L/202937111.
http://www.homedepot.com/p/ReceptXtenders-1-Gang-3-8-in-Electrical-Receptacle-Box-Extension-Ring-00003/100175417.
http://www.youtube.com/watch?v=nHRIJ3kjYL4.
http://www.secura-lets.com/.
http://www.eaccu-tech.com/faceplates-mount-boxes/faceplate-mounting-brackets/mpls-erico-single-gang-mounting-plate-bracket/.
http://www.firefold.com/lvh1.
http://www.google.com/#q=non-metallic+low+voltage+mounting+bracket+existing+construction&tbm=shop&spd=5490109825329670376.
http://www.homedepot.com/p/RACO-1-Gang-Flush-Fit-Wall-Plate-Spacer-3-Pack-999X/304353271.

* cited by examiner

*Primary Examiner* — Carl J Arbes
(74) *Attorney, Agent, or Firm* — Michael P. Mazza; Michael P. Mazza, LLC

(57) ABSTRACT

A flush ring spacer, and method for using it, to adjustably support and firmly mount an electrical device, such as an electrical receptacle or switch, within a wall or other support surface. Using the present invention, electrical devices may be connected to 1,900 (4-square), gem or other electrical boxes, while remaining firmly flush to the wall or other surface. The electrical device will stay grounded and not move or push in (which can affect grounding), and the face plate will not crack and will no longer be used to support the electrical device.

7 Claims, 3 Drawing Sheets

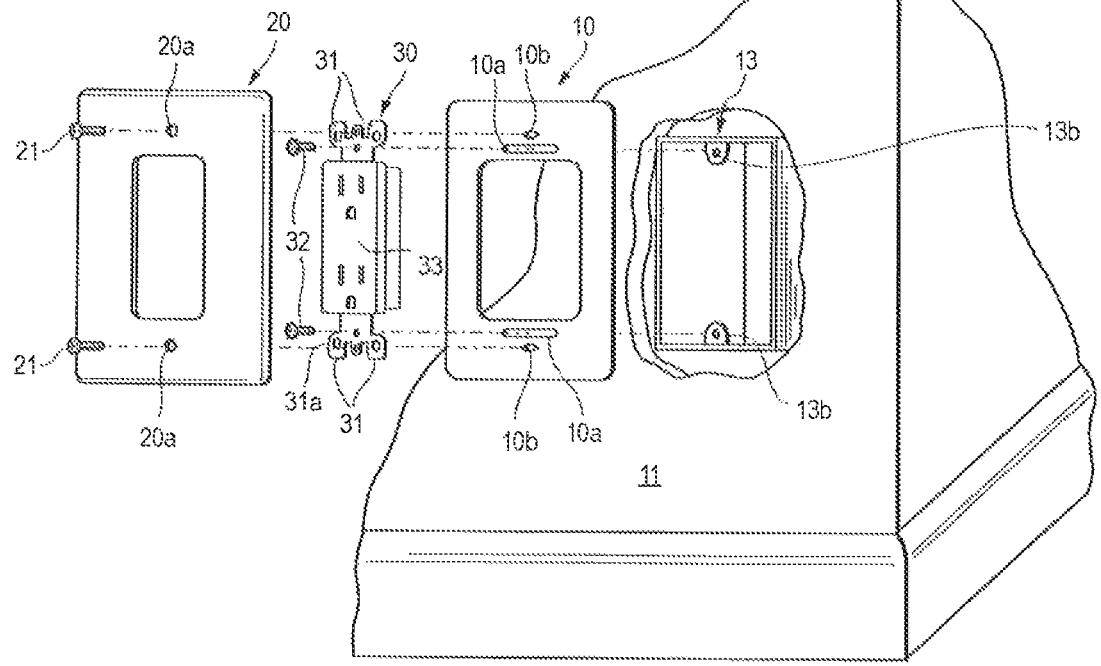
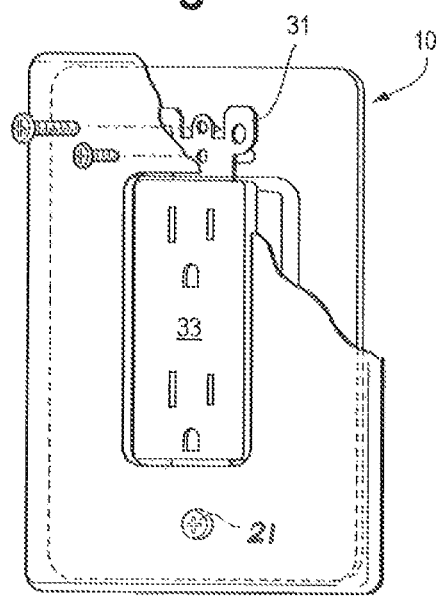
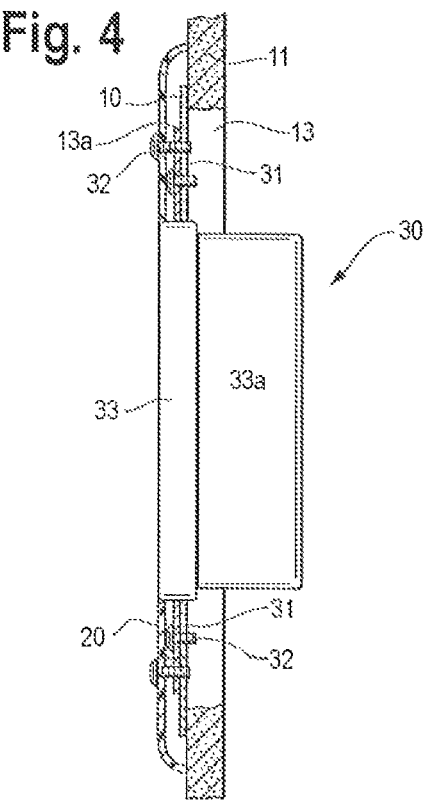

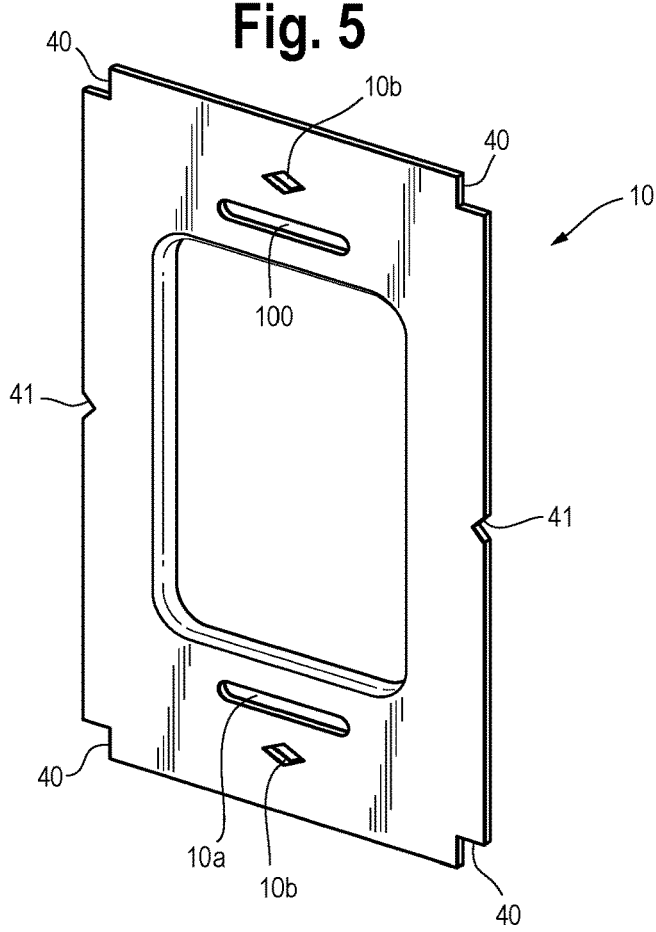
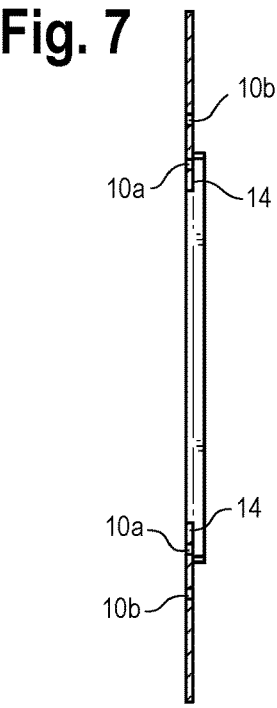
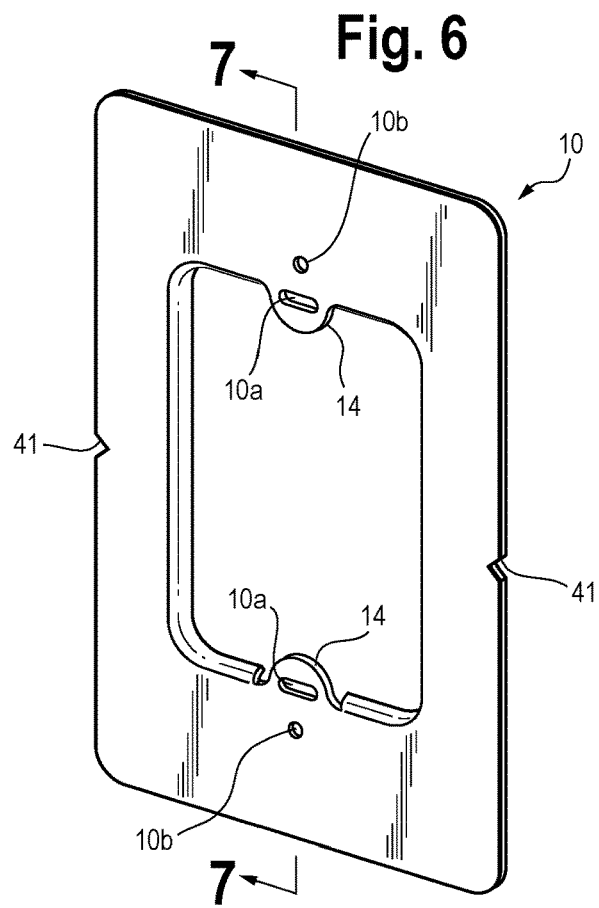

US 11,063,397 B2

FLUSH RING SPACER FOR ELECTRICAL RECEPTACLES

BACKGROUND OF THE INVENTION

The present invention generally relates to spacers for electrical receptacles.

When an electrical device such as an electrical receptacle or switch is mounted to a wall or other support surface, it is electrically connected to building wiring, by electrically and mechanically connecting the device to an electrical box, such 1900 (4-square), gem or other electrical boxes, inside the wall, for example. The device is typically fastened to the face of the electrical box device (or "mud") ring using 6-32 screws. Conventionally, at least during initial placement, the opening in the wall or other surface used for recessing the electrical device has minimal clearance to admit only the device, and the device has extending projections that engage the wall surface around the opening so that the device mounts flush with the wall surface. Ordinarily, a hole in the wall is cut large enough to receive the electrical box device ring, which may or may not be grounded, and which is contentedly to the electrical device; the hole in the wall is preferably also cut small enough so that the ears on the yoke of the device can engage the face of the wall. Using fasteners, the yoke is held against the wall surface in position to receive a cover plate that rests against the wall and covers the assembly.

However, when the opening is oversized, or the opening (which may be made of particle board, gypsum plaster, green board, tile or the like), through use, gets larger, the projections and/or the receptacle or switch itself can pass/fall through the opening (e.g., the yoke of the electrical receptacle can be drawn into the opening by the mounting screw), such that the receptacle is no longer secured firmly and mounted flush with the wall. The wall opening can also become oversized during initial installation, such as when a piece of plaster or board inadvertently breaks off; or this can occur due to post-installation wear and abrasion from users pulling on a wire/cord, and thus the outlet box, which can grind against or wear away the wall portion adjacent the opening, during use. Oversized openings can also be a result of new or refurbishing construction in which the wall or other surface is changed, such as by adding wainscoting, cork board, tile, etc.

It is an object of the present invention to prevent this problem by providing a flush ring spacer that firmly and securely mounts and supports an electrical device, such as an electrical receptacle or switch, to a wall or other support, without the need for later re-adjustment, re-fitting, or change-out. Other attendant advantages will become apparent to those of ordinary skill in the art upon reading the below disclosure.

SUMMARY OF THE INVENTION

The objects mentioned above, as well as other objects, are solved by the present invention, which overcomes disadvantages of prior spacers for electrical receptacles, while providing new advantages not previously associated with them.

In a preferred embodiment, a flush ring spacer is provided for use in electrically connecting an electrical device to an electrical box device ring, and for adjustably supporting and firmly mounting the electrical device within a wall or other support surface. The electrical device has a yoke and yoke apertures for receiving one or more mounting fasteners. When the electrical device is secured to the wall or other surface, the yoke of the electrical device is interdisposed between a face plate and the flush ring spacer. The flush ring spacer includes a metallic spacer plate with an interior cutout; a circumference of the interior cutout is sufficient to expose a working portion of the electrical device. The metallic spacer plate also includes: one or more of a first set of metallic plate apertures, enabling the metallic spacer plate to be attached to the yoke of the electrical device using the one or more mounting fasteners; and one or more of a second set of metallic plate apertures for receiving one or more of the mounting fasteners, for use in securing the face plate to the yoke apertures of the electrical device. Using the flush ring spacer, the electrical device is electrically connected to the electrical box flush ring, while also being firmly mounted to or within the wall or other support surface.

In one preferred embodiment, one or more of the first set of the metallic plate apertures are generally slot-shaped, and one or more of the second set of the metallic plate apertures are non-circular in shape, such as diamond-shaped cutouts. The metallic spacer plate may include one or more ribs to provide strength and rigidity, particularly along at least along a longitudinal portion of the metallic spacer plate.

Preferably, the metallic spacer plate has an exterior circumference smaller than an exterior circumference of the face plate, such that the face plate covers the metallic spacer plate when mounted.

A method for electrically connecting an electrical device to an electrical box device ring within a wall or other support surface, and also for adjustably supporting and firmly mounting the electrical device within the wall or other support surface, is also disclosed and claimed. The electrical device has yoke and yoke apertures for receiving one or more mounting fasteners. A flush ring spacer is selected having a metallic spacer plate with an interior cutout with a circumference sufficient to expose a working portion of the electrical device. The metallic spacer plate also includes one or more of a first set and a second set of metallic plate apertures. An appropriately-sized face plate is selected. Now, the electrical device is connected to the electrical box device ring, and is securely mounted within the wall or other support surface by interdisposing the yoke of the electrical device between the face plate and the flush ring spacer, and then using the one or more mounting fasteners to attach: (a) the metallic spacer plate, using the first set of metallic plate apertures, to the yoke of the electrical device; and (b) the face plate to the yoke apertures of the electrical device, using the second set of the metallic plate apertures.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Electrical device" means various electrical devices that may be connected to an electrical box and mounted on or within a wall or other support surface including, without limitation, electrical receptacles with one or more electrical outlets, switches, data jacks, coaxial devices, HDMIs, or other low-voltage or high-voltage devices.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 2 is a perspective view showing the preferred flush ring spacer of FIG. 1 with the mounting bracket/cover and switch, relative to a wall fitting;

FIG. 3 is a top view showing how the various parts of FIG. 2 fit together;

FIG. 4 is a side perspective and partially sectional view of FIG. 3;

FIG. 5 is a top and side perspective view of another preferred embodiment of the flush ring spacer of the present invention;

FIG. 6 is a top and side perspective view of yet another preferred embodiment of the flush ring spacer of the present invention; and FIG. 7 is a side view, in partial cross-section, taken along reference line 7-7 of FIG. 7.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Figure 1:
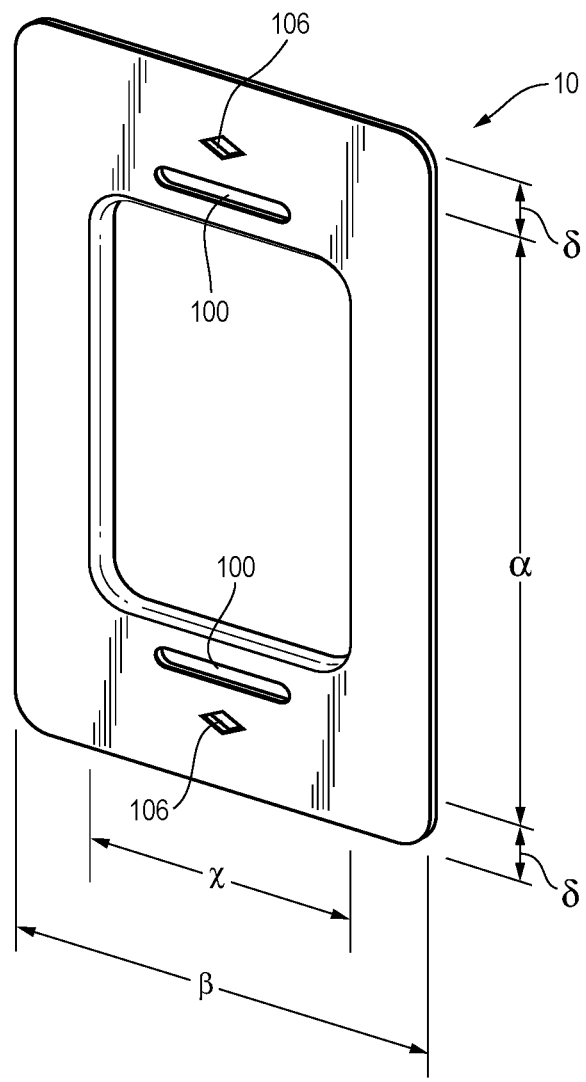
FIG. 1 is a top and side perspective view of a flush ring spacer according to a preferred embodiment of the present invention.

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Referring to FIGS. 2-4, as electrical tradespersons well know, a face plate 20 may be mounted over an electrical receptacle 30, to a device ring 13a of an electrical box 13, with the attendant disadvantages discussed above. Referring now to the present invention, and to FIGS. 1-4, a preferred embodiment of a flush ring spacer according to the present invention is shown, and generally indicated by reference numeral 10. Flush ring spacer 10 is used to help adjustably support an electrical device, such as electrical receptacle 30, with having face 33, base 33a, yokes 31, yoke apertures 31a and mounting screws 32.

To mount electrical receptacle 33 using the present invention, flush ring spacer 10 is positioned over electrical box device ring 13 having yoke apertures 13b. Face 33 of electrical receptacle 30 may be centered within flush ring spacer 10, and mounting screws 32 (only two shown) may be fastened by threading the fasteners through yoke apertures 31a of receptacle face 33, through slots 10a on spacer 10, and then through electrical box flush ring yoke apertures 13a. Last, face plate 20 may be fastened by securing fasteners 21 through face plate apertures 20a and then through diamond-shaped cutouts 10b on flush ring spacer 10. (The present invention can be used with all standard electrical box device rings, such as but not limited to double-gang and triple-gang device rings.)

Additionally, while slots 10a on flush ring spacer 10 may be a variety of shapes and sizes, it will be understood by those of ordinary skill in the art that slots 10a are preferably shaped and sized to allow the tradesperson to receive visual and tactile feedback so that the electrical device can be appropriately and properly mounted.

Similarly, generally diamond-shaped cutouts/apertures 10b may be shapes and sizes other than as shown in FIG. 1-5, such as the circular cutouts shown in FIG. 6, or other shapes and sizes. However, it will be understood by those of ordinary skill in the art that cutouts 10b are preferably shaped and sized to provide the tradesperson with sufficient up/down and left/right flexibility/play so that the corresponding fasteners can be easily placed through apertures on the face plate and then through these cutouts.

Flush ring spacer 10 may be used either during initial installation, or after installation in a retrofit. Flush ring spacer 10 preferably has sufficient strength and rigidity, such as being made of 20-gauge steel, so that it has sufficient rigidity for firm and secure mounting of the electrical device, and also to withstand typical forces applied to an outlet box during use. Flush ring spacer 10 is also preferably located and sized so that it can accommodate typical wall receptacles, for example.

Referring now to FIG. 5, 90° corner cutouts 40 and mid-cutouts 41 may be formed on flush ring spacer 10. Corner cutouts 40 may facilitate mounting, as commonly-available face plates may be more readily found which cover a flush ring with such cutouts. Mid-cutouts 41 are advantageous to allow the tradesperson, during installation, to make markings on the wall, for example, to facilitate the level placement of flush ring spacer 10 on the wall.

Referring to FIG. 6, different sizes and shapes for slot 10a and circular cutout 10b may be used, as shown. Also, the inside edge of spacer 10 may include a bulge or protuberance 14 which may allow spacer 10 to better mirror surface coverage by a corresponding face plate.

Referring to FIGS. 1 and 5-7, flush ring spacer 10 may include longitudinal ribs 10c, which may be desirable to strengthen the spacer.

Referring back to FIG. 1, as a non-limiting, representative example, a flush ring spacer of the present invention may have the following dimensions, for use with a standard electrical box device ring: $\beta$=3 and $3/16$ inches; $\alpha$=3 and $7/8$ inches; $\delta$=$17/32$ inches; and x=1 and $15/16$ inches. Also, the horizontal length of diamond cutouts 10b may be $1/4$-inch, and the vertical height of both slots 10a and diamond cutouts 10b may be $5/32$-inches. The horizontal length of slots 10a may be 1-inch. Finally, slots 10a and cutouts 10b may be horizontally-centered on flush ring spacer 10.

Persons of ordinary skill in the art will now understand that the present invention solves the above-referenced problems of prior face plate mounting systems, allowing the secure mount of receptacles and switches to any rigid, substantially planar surface, such as a wall or floor, that fasteners can be attached to, so the receptacles or switches may be connected to 1900 (4-square), gem or other electrical boxes, while remaining firmly flush to the wall or other surface. The receptacle or switch will stay grounded and not move or push in (which can affect grounding). The faceplate will not crack and will no longer be used to support the receptacle or switch.

It will also be understood that slots 10b and cutouts 10a of flush ring 10 may be a variety of other shapes and sizes, as may be desired for a particular application.

Use of the present invention also allows the tradesman to cut the drywall, or other material, and install an electrical box which is larger than the outer circumference of the receptacle or switch, as the flush ring of the present invention will completely cover the cutout hole while allowing the receptacle or switch to be firmly secured to the wall or other surface.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A flush ring spacer for use in electrically connecting an electrical device to a single-gang or multi-gang electrical box device ring located within a wall or other support surface, and for use in adjustably supporting and firmly mounting the electrical device within the wall or other support surface, the electrical device having a yoke and yoke apertures for receiving one or more mounting fasteners, and the yoke of the electrical device being interdisposed between a face plate and the flush ring spacer during the mounting of the electrical device, the flush ring spacer comprising:
   a metallic spacer plate with an interior cutout, wherein a circumference of the interior cutout is sufficient to expose a working portion of the electrical device;
   wherein the metallic spacer plate comprises one or more of a first set of metallic plate apertures enabling the metallic spacer plate to be attached to the yoke of the electrical device using the one or more grounding and mounting fasteners, thereby enabling the electrical device to be electrically grounded and to be firmly secured to the wall or other surface; and
   wherein the metallic spacer plate comprises one or more of a second set of metallic plate apertures for receiving one or more of the grounding and mounting fasteners, for use in securing the face plate to the yoke apertures of the electrical device,
   thereby enabling the electrical device to be electrically connected to the electrical box device ring, while also securely mounting the electrical device within the wall or other support surface.

2. The flush ring spacer of claim 1, wherein the one or more of the first set of the metallic plate apertures are generally slot-shaped.

3. The flush ring spacer of claim 1, wherein the one or more of the second set of the metallic plate apertures are non-circular in shape.

4. The flush ring spacer of claim 1, wherein the one or more of the second set of the metallic plate apertures are generally diamond-shaped.

5. The flush ring spacer of claim 1, wherein the metallic spacer plate comprises one or more ribs providing strength and rigidity at least along a longitudinal portion of the metallic spacer plate.

6. The flush ring spacer of claim 1, wherein the metallic spacer plate has an exterior circumference smaller than an exterior circumference of the face plate, such that the face plate covers the metallic spacer plate when mounted.

7. A method for electrically connecting an electrical device to a single-gang or multi-gang electrical box device ring located within a wall or other surface, and for adjustably supporting and firmly mounting the electrical device within the wall or other support surface, using a flush ring spacer, the electrical device having a yoke and yoke apertures for receiving one or more mounting fasteners, comprising the steps of:
   selecting a flush ring spacer with a metallic spacer plate having an interior cutout, wherein a circumference of the interior cutout is sufficient to expose a working portion of the electrical device, and wherein the metallic spacer plate includes one or more of a first set and a second set of metallic plate apertures;
   selecting an appropriately-sized face plate; and
   securing the electrical device to the wall or other surface by interdisposing the yoke of the electrical device between the face plate and the flush ring spacer, and then using the one or more of the mounting fasteners to attach: (a) the metallic spacer plate, using the first set of metallic plate apertures, to the yoke of the electrical device, thereby enabling the electrical device to be electrically grounded and to be firmly secured to the wall or other surface; and (b) the face plate to the yoke apertures of the electrical device, also using the second set of the metallic plate apertures.

* * * * *